(12) United States Patent
Head et al.

(10) Patent No.: US 12,480,589 B2
(45) Date of Patent: Nov. 25, 2025

(54) PRESSURE RELIEF VALVE ASSEMBLY INCLUDING SERIES COUPLED VALVES AND RELATED METHODS

(71) Applicant: PREVCO Subsea LLC, Fountain Hills, AZ (US)

(72) Inventors: John Head, Fountain Hills, AZ (US); James French, Chandler, AZ (US); Don Christensen, Fountain Hills, AZ (US)

(73) Assignee: PREVCO Subsea LLC, Fountain Hills, AZ (US)

( * ) Notice: Subject to any disclaimer, the term of this patent is extended or adjusted under 35 U.S.C. 154(b) by 14 days.

(21) Appl. No.: 18/786,377

(22) Filed: Jul. 26, 2024

(65) Prior Publication Data
US 2024/0384806 A1    Nov. 21, 2024

Related U.S. Application Data

(63) Continuation-in-part of application No. 18/202,882, filed on May 26, 2023, now Pat. No. 12,085,181,
(Continued)

(51) Int. Cl.
*F16K 17/06* (2006.01)
*F16K 15/06* (2006.01)
(Continued)

(52) U.S. Cl.
CPC .......... *F16K 17/044* (2013.01); *F16K 15/066* (2013.01); *F16K 17/06* (2013.01);
(Continued)

(58) Field of Classification Search
CPC ......... F16K 2200/101; F16K 2200/102; F16K 2200/202; F16K 2200/204;
(Continued)

(56) References Cited

U.S. PATENT DOCUMENTS 53,396 A    3/1866  Birkinbine
54,768 A    5/1866  Pollock
(Continued)

FOREIGN PATENT DOCUMENTS

GB           731863 A    6/1955

*Primary Examiner* — Craig J Price
(74) *Attorney, Agent, or Firm* — Allen, Dyer, Doppelt + Gilchrist, P.A. Attorneys at Law

(57) ABSTRACT

A pressure relief valve (PRV) assembly may include a housing having an opening therein, an interior cavity, a passageway extending between the opening and the interior cavity, and a flange extending within the passageway adjacent the opening. The PRV assembly may also include a first stage valve carried within the interior cavity, and a second stage valve fluidly coupled in series with the first stage valve. The second stage valve may include an enlarged head carried within the opening and a shaft extending from the enlarged head through the passageway to the interior cavity. The shaft may have a proximal end coupled to the enlarged head and an opposing enlarged distal end adjacent the interior cavity. A biasing member may be between the enlarged distal end and the flange. The biasing member may be configured to bias the first and second stage valves to a closed position.

23 Claims, 12 Drawing Sheets

Related U.S. Application Data which is a continuation of application No. 17/900,204, filed on Aug. 31, 2022, now Pat. No. 11,703,139, which is a continuation of application No. 16/744,133, filed on Jan. 15, 2020, now Pat. No. 11,473,685.

(60) Provisional application No. 62/792,739, filed on Jan. 15, 2019.

(51) Int. Cl.
  *F16K 17/04* (2006.01)
  *F16K 17/10* (2006.01)

(52) U.S. Cl.
  CPC ......... *F16K 17/10* (2013.01); *Y10T 137/0486* (2015.04); *Y10T 137/0491* (2015.04); *Y10T 137/7743* (2015.04); *Y10T 137/7838* (2015.04); *Y10T 137/7846* (2015.04)

(58) Field of Classification Search
  CPC ............ F16K 2200/302; F16K 15/023; F16K 15/026; F16K 15/063; F16K 17/044; F16K 17/06; F16K 17/066; F16K 17/10; F16K 15/066; Y10T 137/7846; Y10T 137/7838; Y10T 137/7743; Y10T 137/7841; Y10T 137/88062; Y10T 137/0486; Y10T 137/0491
  USPC .... 137/513, 512.2, 512, 478, 474, 469–470, 137/614.17, 614.23, 613, 529, 543.13, 137/542, 493.6, 493.5, 493.4, 493, 15.17, 137/15.18, 614.18, 907, 496, 506; 251/82, 83
  See application file for complete search history.

(56) References Cited

U.S. PATENT DOCUMENTS

| | | | |
|---|---|---|---|
| 72,363 A | 12/1867 | Cameron | |
| 156,769 A | 11/1874 | Cameron | |
| 160,869 A | 3/1875 | Bowers | |
| 173,521 A | 2/1876 | Warner | |
| 570,727 A | 11/1896 | Gale | |
| 591,015 A | 10/1897 | Schreidt | |
| 675,100 A * | 5/1901 | McDougall et al. | B60T 17/043 137/596.2 |
| 709,273 A | 9/1902 | Macdonald | |
| 765,638 A | 7/1904 | Schramm | |
| 782,162 A | 2/1905 | Mccarl | |
| 899,584 A * | 9/1908 | Whitaker | F16K 15/025 417/558 |
| 965,052 A | 7/1910 | Wainwright | |
| 1,053,623 A * | 2/1913 | McMillion | F16K 15/20 137/226 |
| 1,087,108 A | 2/1914 | Cummings et al. | |
| 1,170,050 A | 2/1916 | Daniels | |
| 1,262,641 A | 4/1918 | Cockburn et al. | |
| 1,342,985 A * | 6/1920 | Cash | F16K 17/196 220/203.26 |
| 1,367,361 A | 2/1921 | Lewis | |
| 1,493,149 A | 5/1924 | Crandall | |
| 1,608,869 A * | 11/1926 | Tilton | E21B 36/00 166/300 |
| 1,699,095 A | 1/1929 | Clark | |
| 1,799,266 A | 4/1931 | Wallace | |
| 1,862,311 A | 6/1932 | Kling | |
| 1,878,356 A | 9/1932 | Wilcox | |
| 1,939,844 A | 12/1933 | Down | |
| 1,977,806 A | 10/1934 | Richardson | |
| 2,101,316 A | 12/1937 | Kettnich | |
| 2,148,253 A | 2/1939 | Barge | |
| 2,178,901 A * | 11/1939 | Webster | F16K 17/04 73/1.72 |
| 2,192,592 A | 3/1940 | Allen | |
| 2,202,211 A | 5/1940 | Kling | |
| 2,361,866 A | 10/1944 | Norway | |
| 2,371,720 A | 3/1945 | Stine | |
| 2,449,392 A | 9/1948 | Kremiller | |
| 2,470,471 A * | 5/1949 | Carleton | F16K 15/066 137/99 |
| 2,526,197 A * | 10/1950 | Cannon | F01M 5/00 137/493 |
| 2,590,408 A | 3/1952 | Henneman | |
| 2,630,294 A * | 3/1953 | Ericson | F16K 5/225 137/512 |
| 2,643,090 A | 6/1953 | Cluphf | |
| 2,713,874 A | 7/1955 | Sundstrom | |
| 2,744,469 A | 5/1956 | Schaefer | |
| 2,784,561 A | 3/1957 | Postlewait | |
| 2,888,876 A | 6/1959 | Nichols | |
| 3,450,147 A * | 6/1969 | Webb | B60C 23/0496 137/230 |
| 3,542,063 A | 11/1970 | Etter et al. | |
| 3,916,946 A * | 11/1975 | Motzer | F16K 17/044 137/538 |
| 3,939,866 A * | 2/1976 | Pignatelli | B60K 15/04 220/203.26 |
| 3,974,848 A | 8/1976 | Wheatley | |
| 4,485,843 A | 12/1984 | Wolff | |
| 4,617,959 A * | 10/1986 | Yamada | F16K 15/033 137/514.7 |
| 4,889,154 A | 12/1989 | Rosenberg | |
| 5,012,834 A | 5/1991 | Taylor | |
| 5,465,752 A | 11/1995 | Higgins | |
| 5,676,172 A | 10/1997 | Mukumoto | |
| 6,179,052 B1 | 1/2001 | Purkis et al. | |
| 6,279,247 B1 * | 8/2001 | Neitzel | F16C 11/045 33/727 |
| 6,659,184 B1 | 12/2003 | Tips et al. | |
| 6,668,853 B2 | 12/2003 | Dean | |
| 7,073,527 B1 * | 7/2006 | Freire Teiga | F16K 17/18 137/228 |
| 7,178,552 B2 | 2/2007 | Takeda | |
| 7,434,593 B2 | 10/2008 | Noll et al. | |
| 7,568,497 B1 * | 8/2009 | Langenfeld | F16K 15/025 137/493.6 |
| 8,042,565 B2 * | 10/2011 | Ball | F16K 15/066 137/218 |
| 8,136,546 B2 | 3/2012 | Griffiths et al. | |
| 8,191,575 B2 * | 6/2012 | Krug, Jr. | F16L 37/30 137/15.18 |
| 8,302,621 B2 * | 11/2012 | Schniederjan | F16K 17/196 137/538 |
| 8,353,311 B2 | 1/2013 | Rigamonti et al. | |
| 8,622,082 B1 | 1/2014 | Roys | |
| 8,695,651 B2 * | 4/2014 | Frenal | F16K 1/308 141/286 |
| 9,255,558 B2 * | 2/2016 | Burke | F23R 3/283 |
| 9,354,638 B2 | 5/2016 | Rebreanu et al. | |
| 9,732,868 B2 * | 8/2017 | Bertoldi | F16K 17/048 |
| 10,208,866 B2 | 2/2019 | Fisher | |
| 10,337,630 B2 * | 7/2019 | Apadula | F16K 17/044 |
| 11,473,685 B2 | 10/2022 | Christensen et al. | |
| 11,499,648 B2 * | 11/2022 | Pávics | F16K 31/44 |
| 2003/0205271 A1 | 11/2003 | Lee | |
| 2006/0213556 A1 | 9/2006 | Royse | |
| 2008/0000310 A1 | 1/2008 | Ide et al. | |
| 2009/0178715 A1 | 7/2009 | Griffiths et al. | |
| 2009/0250928 A1 | 10/2009 | Rigamonti et al. | |
| 2014/0360590 A1 | 12/2014 | Bertoldi et al. | |
| 2015/0276072 A1 | 10/2015 | Rebreanu et al. | |
| 2016/0084390 A1 | 3/2016 | He et al. | |
| 2016/0096631 A1 * | 4/2016 | Reinholdt | G05D 16/0402 137/613 |
| 2016/0259349 A1 | 9/2016 | Rebreanu et al. | |

\* cited by examiner

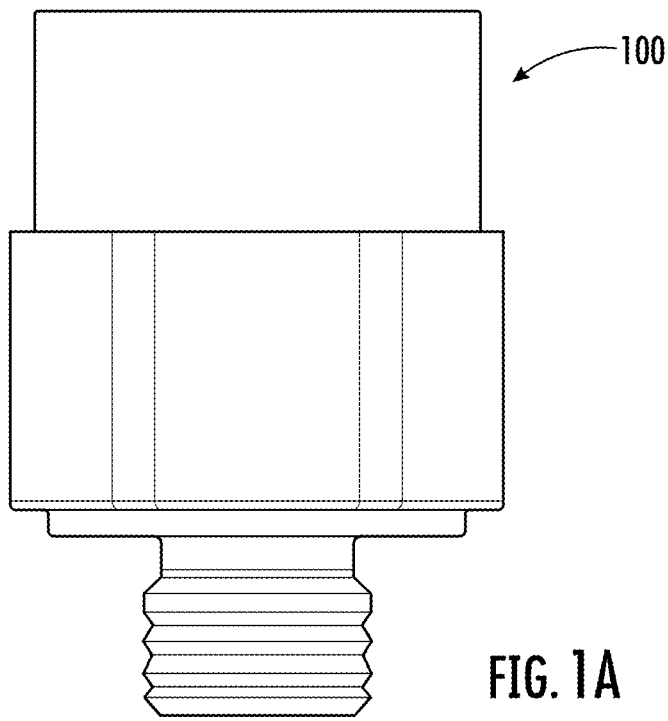
FIG. 1A
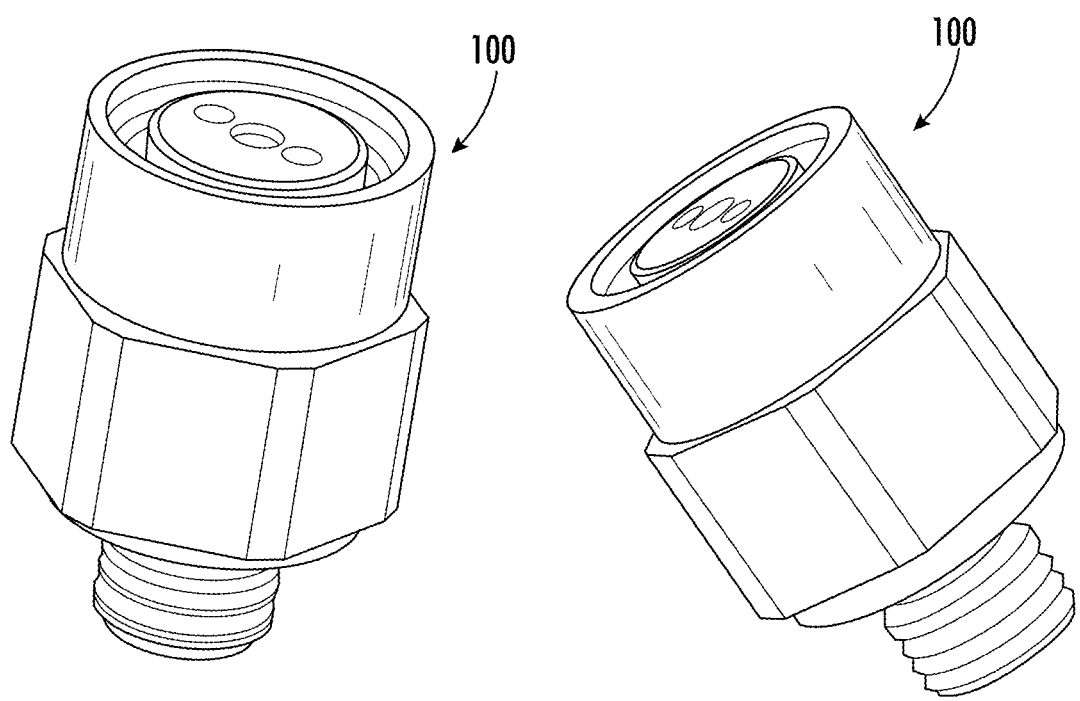
FIG. 1B
FIG. 1C

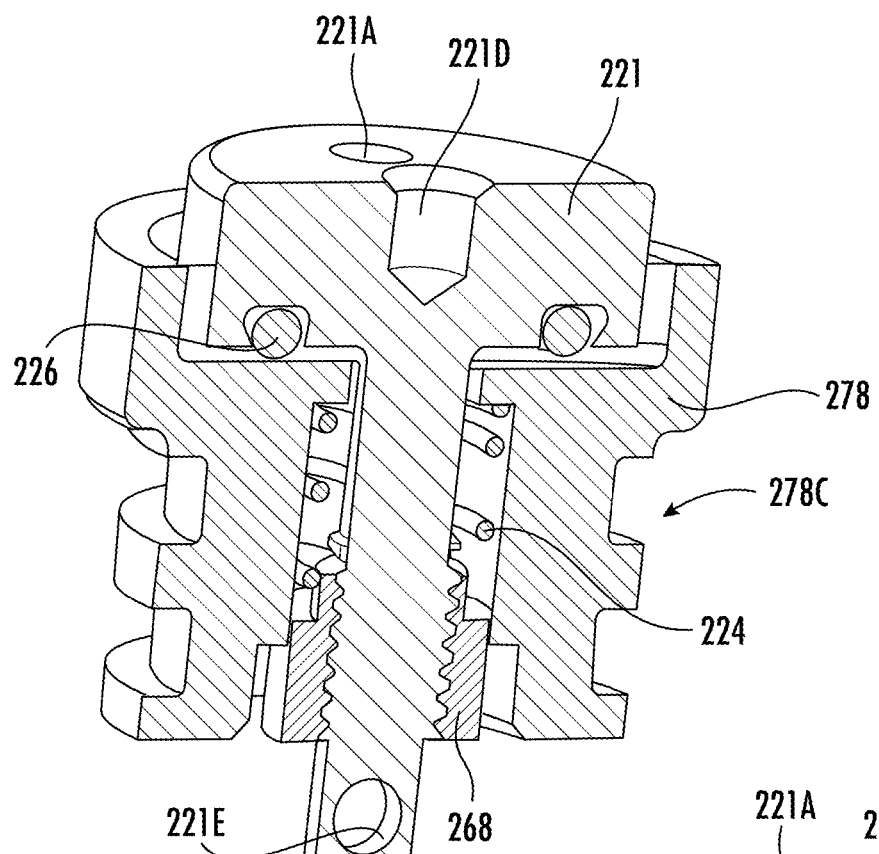
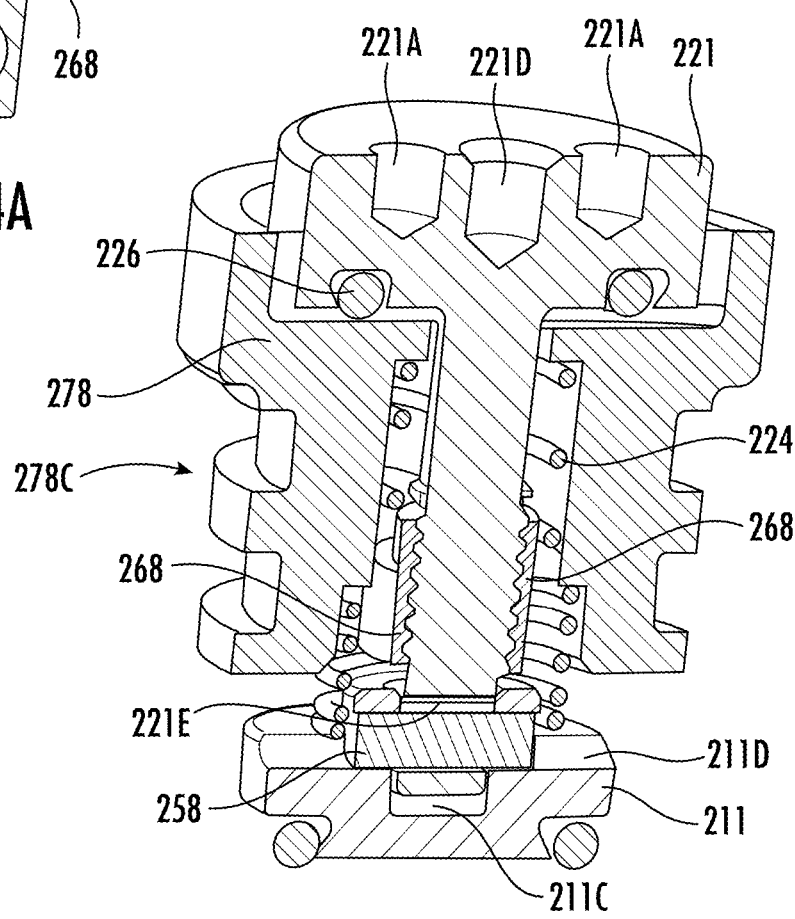
FIG. 4A
FIG. 4B

PRESSURE RELIEF VALVE ASSEMBLY INCLUDING SERIES COUPLED VALVES AND RELATED METHODS

RELATED APPLICATIONS

The present application is a continuation-in-part application of Ser. No. 18/202,882 filed May 26, 2023, which is a continuation application of Ser. No. 17/900,204 filed Aug. 31, 2022, now U.S. Pat. No. 11,703,139, which is a continuation of U.S. patent application Ser. No. 16/744,133, now U.S. Pat. No. 11,473,685, which claims the priority benefit of provisional application Ser. No. 62/792,739 filed on Jan. 15, 2019, the entire contents of which are herein incorporated by reference.

TECHNICAL FIELD

The disclosure relates to a dual poppet pressure relief valve with vacuum adaptor capability.

BACKGROUND

For various reasons, a pressure differential may be formed between an internal pressure inside of a sealed enclosure and an external pressure outside of the enclosure (such as a subsea housing). A Pressure Relief Valve (PRV) can be used on the sealed enclosure to prevent the internal pressure from becoming significantly higher than the external pressure. For safety reasons, the internal pressure should not become significantly higher than the external pressure.

For example, in the subsea industry pressure relief valves with relatively low cracking pressures are often used as a safety device to prevent the buildup of inside pressure within a subsea electronics housing. Subsea housings are hydrostatic pressure vessels designed for external pressure and are typically not capable of withstanding even modest relative internal pressure without failure. Significant internal pressures can develop as the result of hydraulic leaks, battery off-gassing and/or slow sea water leaks that cannot relieve internal pressure quickly enough during recovery to the surface.

Unfortunately, pressure relief valves have a reputation for poor reliability in the subsea environment. Corrosion and fouling of the moving parts by suspended particulate matter can sometimes lead to failure by preventing the valve from reseating sufficiently to establish a reliable seal. While the use of redundant corrosion resistant materials and seals improve reliability of subsea pressure relief valves these enhancements do not address the fundamental problem of the mechanical parts within the valve, each being single point of failure.

In prior implementations, a PRV can include a valve body, a poppet that seals on the valve body, a spring that encourages the poppet to stay in contact with the valve body to maintain a seal, and a nut that holds the spring in place. The seal of the PRV on the poppet may permit egress of the internal pressure without allowing the ingress of external environment (such as seawater), as this could destroy valuable equipment residing internal to the sealed enclosure. However, even a single piece of debris may become lodged within a sealing area of prior PRVs, leading to potentially catastrophic single point failure.

There is often a need to be able to evacuate the sealed enclosure and/or backfill the sealed enclosure with a gas or liquid, and to allow venting, evacuation, and/or backfill to occur with higher reliability and without risk of single point failure.

SUMMARY

A pressure relief valve (PRV) assembly may include a housing having an opening therein, an interior cavity, a passageway extending between the opening and the interior cavity, and a flange extending within the passageway adjacent the opening. The PRV assembly may also include a first stage valve carried within the interior cavity and a second stage valve fluidly coupled in series with the first stage valve. The second stage valve may include an enlarged head carried within the opening and a shaft extending from the enlarged head through the passageway to the interior cavity. The shaft may have a proximal end coupled to the enlarged head and an opposing enlarged distal end adjacent the interior cavity. The PRV assembly may also include a biasing member between the enlarged distal end of the shaft and the flange and configured to bias the first and second stage valves to a closed position.

The PRV assembly may also include a coupling member coupling the first stage valve to the shaft. The coupling member may include a locking pin, for example. The biasing member may include a coil spring, for example.

The PRV assembly may further include a second biasing member between the first biasing member and the first stage valve. The passageway may have a recess therein adjacent the interior cavity, and the second biasing member may be in the recess of the passageway, for example. The second biasing member may be around the enlarged distal end of the shaft, for example.

The housing may have an orifice therein from the interior cavity to an exterior of the housing. The first stage valve may include a first stage valve body and a seal carried by the first stage valve body, and the seal may be configured to sealably engage adjacent portions of the housing within the interior cavity, for example.

The first stage valve may include a first stage valve body having a first opening therein receiving the shaft therein. The PRV assembly may also include a coupling member. The shaft may have a shaft opening therein adjacent the enlarged distal end thereof, for example. The first stage valve body may have a second opening therein transverse to the first opening and aligned with the shaft opening for receiving the coupling member therethrough, for example.

The second stage valve may include a seal carried by the enlarged head and configured to sealably engage adjacent portions of the housing within the opening. The housing may include first and second nested housings. The PRV assembly may also include a housing seal between the first and second nested housings, for example A method aspect is directed to a method of making a pressure relief valve (PRV) assembly. The method may include positioning a first stage valve within an interior cavity of a housing having an opening therein, a passageway extending between the opening and the interior cavity, and a flange extending within the passageway adjacent the opening. The method may include positioning a second stage valve fluidly in series with the first stage valve. The second stage valve may include an enlarged head carried within the opening and a shaft extending from the enlarged head through the passageway to the interior cavity. The shaft may have a proximal end coupled to the enlarged head and an opposing enlarged distal end adjacent the interior cavity. The method may further include positioning a biasing member between the enlarged distal end of the shaft and the flange for biasing the first and second stage valves in a closed position.

The method may also include positioning a coupling member to couple the first stage valve to the shaft. Positioning the coupling member may include coupling a locking pin, for example. Positioning the biasing member may include positioning a coil spring, for example. The method may also include positioning a second biasing member between the first biasing member and the first stage valve.

BRIEF DESCRIPTION OF THE DRAWINGS

FIG. 1A is a plan view of a dual poppet PRV assembly in accordance with aspects of the present disclosure.

FIGS. 1B and 1C are perspective views of a dual poppet PRV assembly in accordance with aspects of the present disclosure.

FIG. 4A is an external poppet assembly in accordance with aspects of the present disclosure showing a second poppet seated in a second stage body/housing.

FIG. 4B is an internal and an external poppet in accordance with aspects of the present disclosure.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and multiple notation is used to indicate similar elements in alternative embodiments.

To improve reliability of the seal of the pressure relief valve (PRV) on the poppet in permitting egress of the internal pressure without allowing the ingress of external media (such as seawater), two independently operating PRVs arranged in series, can be placed in a single valve body. Thereby, if one PRV fails the other will protect the equipment internal to the enclosure, such as a sealed enclosure.

A secondary use of the PRV can be as a conduit to pull a vacuum inside the enclosure (such as a subsea housing in preparation to deploy). The vacuum can provide confirmation that all seals are functioning.

A third use of the PRV can be used as a conduit to allow back-fill with a gas or liquid. On a single poppet PRV, an adaptor can manually lift the poppet and expose a flow path for these procedures.

A fourth use of the PRV can be used as a scuttle valve that is to force the valve open mechanically to allow the external media to flood the internals of the enclosure. This may be used in subsea applications to allow seawater inside the enclosure, which could render the internal equipment unusable.

FIGS. 1A-1C illustrate external views of a dual PRV assembly. A dual PRV 100 may be referred to as a dual poppet relief valve or a dual poppet PRV. The dual PRV can include two poppets in series, including a first poppet (or internal poppet) and a second poppet (or external poppet). The poppets as referred to in this disclosure can be any devices that can open and close flow of a valve seat. The poppets can be formed into any desired shape. The poppets can be formed from any desired material, for example steel, aluminum, or in preferred embodiments, titanium.

Figure 2A:
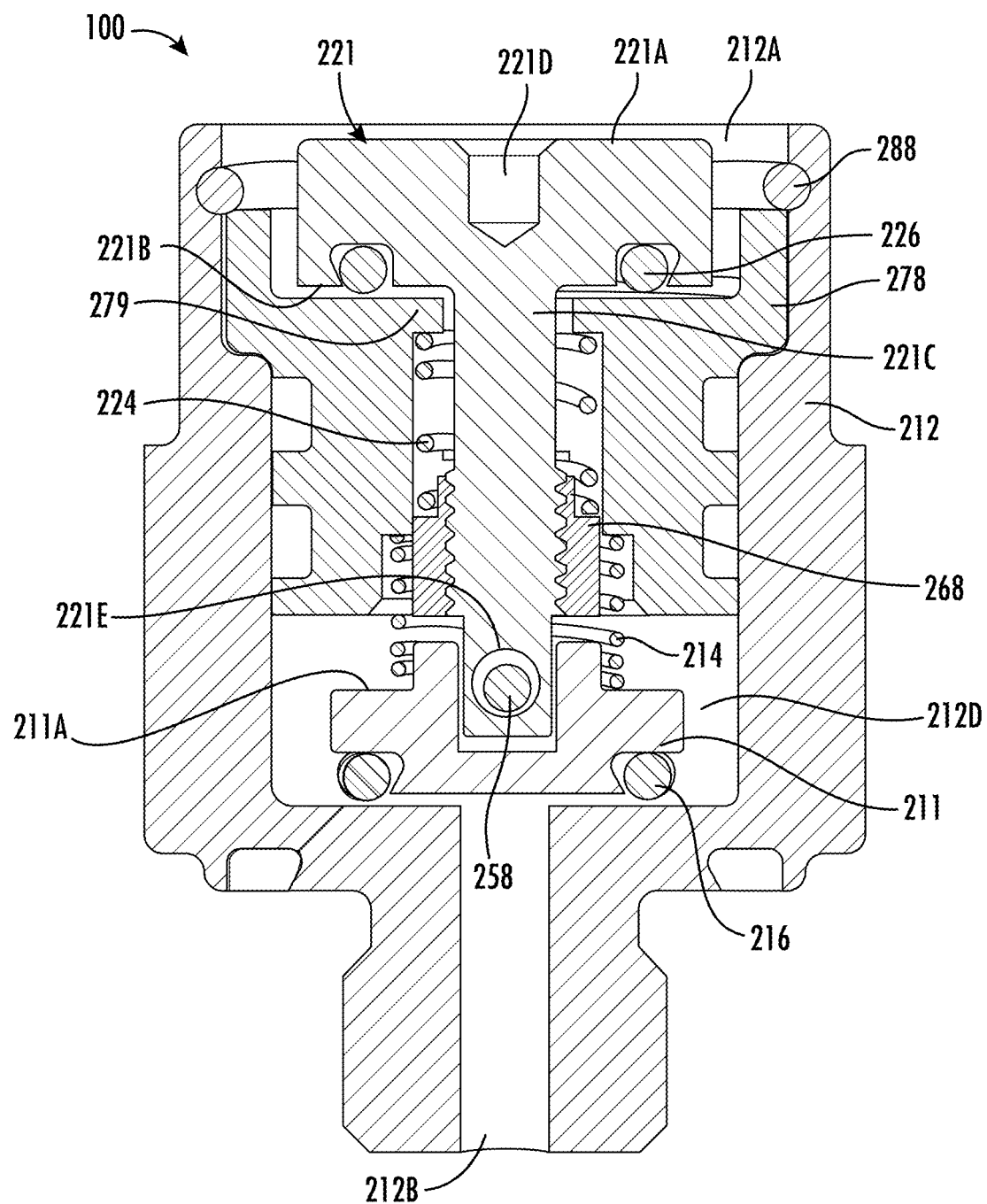
FIG. 2A is a cross sectional view of the dual poppet assembly of FIG. 1A in accordance with aspects of the present disclosure.
Figure 2B:
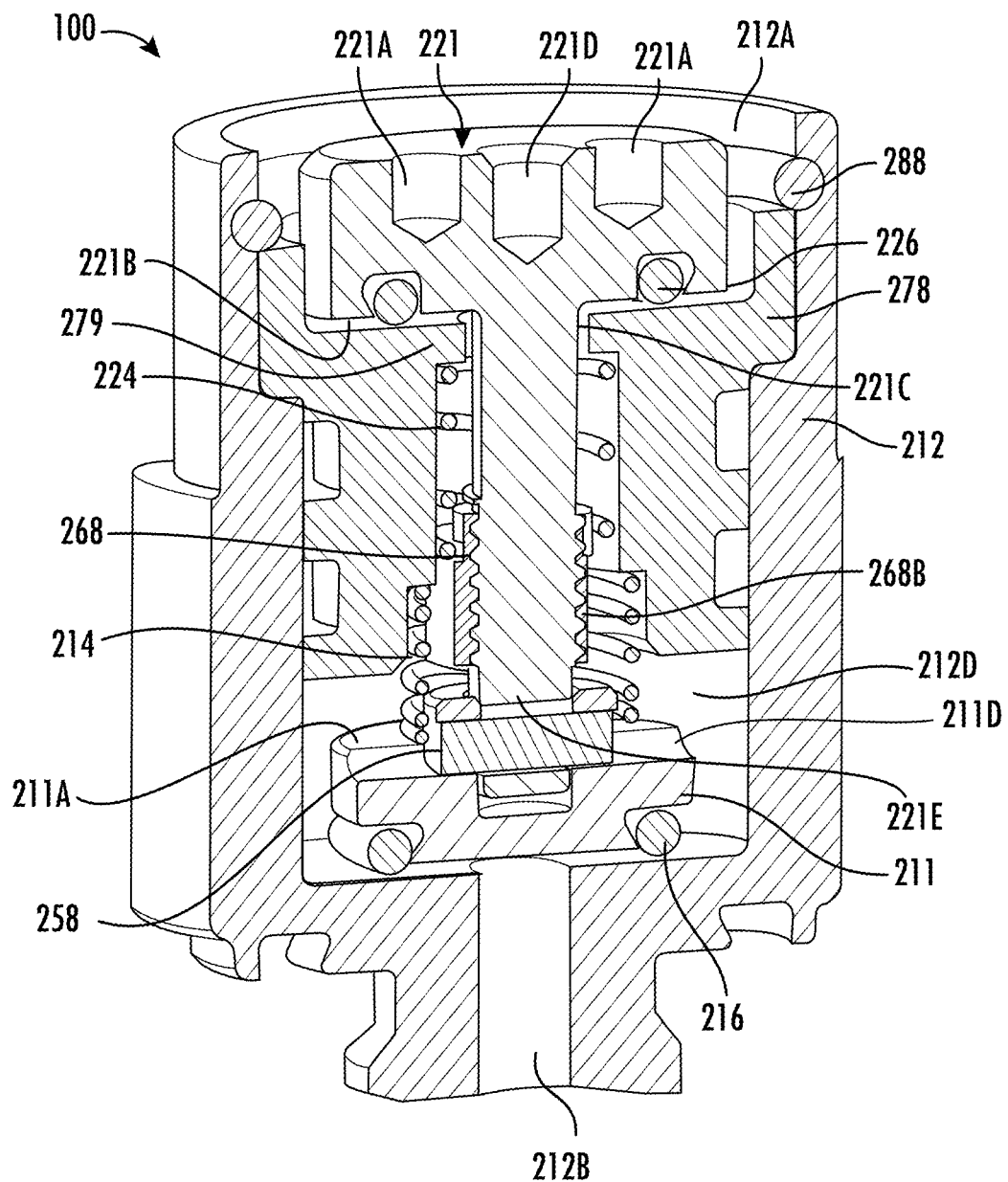
FIG. 2B is another cross sectional view of the tooling for the dual poppet assembly of FIG. 1A in accordance with aspects of the present disclosure, axially rotated approximately 90 degrees from FIG. 2A.
Figure 2C:
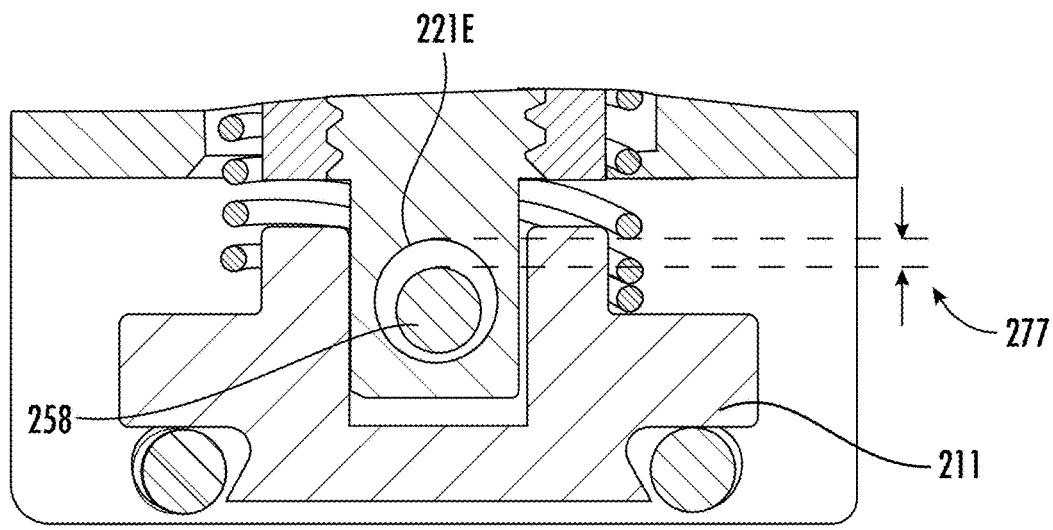
FIG. 2C is an enlarged view of a portion of FIG. 2A, showing a gap disposed between a locking pin and an internal bore of the second stage valve.
Figure 8:
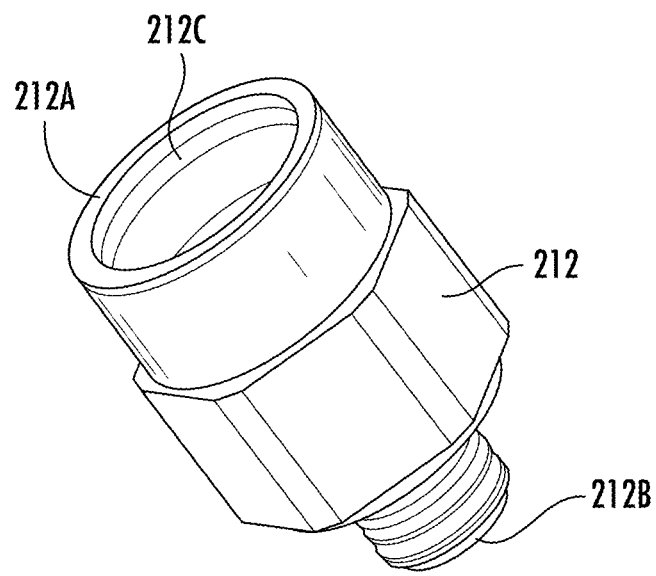
FIG. 8 is a top perspective view of a first valve housing/body of the present invention.
Figure 9:
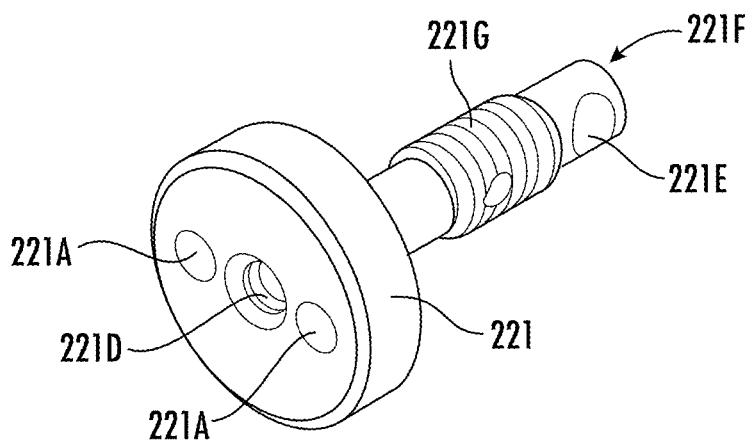
FIG. 9 is a perspective view of a second poppet valve of the present invention.

FIGS. 2A and 2B show, in cross section, an example arrangement of a dual PRV 100 of the present invention. A first stage valve 211 is disposed near an orifice 212B, in the first housing or first body 212. The first stage valve 211 sealably engages a bottom surface of the first housing 212, and with first seal 216, blocks free fluid communication from an interior area through orifice 212B. First stage valve 211 is mechanically coupled to the second stage valve 221 through a pin 258 for example, a locking pin, disposed within a bore 221E of the second stage valve, and the horizontal bore 211D (FIG. 5) of the first stage valve. First stage spring 214 is coupled between a flange 211A of first stage valve 211 and the adjustment nut 268, and more particularly, the first stage spring rests on a flange 279 adjacent the adjustment nut and biases the first stage valve into a closed position. Second stage spring 224 is coupled between the adjustment nut 268 and a second housing or second body 278 and biases the second stage valve 221 into a closed position. Adjustment of the nut 268 allows differential forces to be applied between the first stage valve and second stage valve, thus allowing cracking forces to be selected for each valve. The adjustment nut 268 is shown disposed on a threaded portion 221G (FIG. 9) of the shaft 221C of the second stage valve 221, and additional detail of the second stage valve may be seen as shown in FIG. 9. A second valve seal 226 is disposed within a bottom cavity of the second stage valve 221 and provides sealing between a bottom surface 221B of the second stage valve 221 and the second body 278. The bore 221E is horizontally disposed in a distal end 221F (FIG. 9) of the second stage valve 221, and is disposed to accept the locking pin 258, so that external pulling forces applied to the second stage valve may be coupled through the locking pin to the first stage valve 211. As shown in FIG. 2C, dimensions of the bore 221E and the locking pin 258 are selected to create a desired a gap 277. The dual poppet PRV 100 can include a retainer 288 (FIGS. 2A and 2B) formed of nylon, or other desired material, positioned in an upper portion (e.g., FIG. 8, 212C) of the dual poppet PRV. All parts in the foregoing example which are exposed to sea water may be Titanium, coated to reduce galvanic corrosion.

On a dual PRV, the external poppet may be physically accessible to lift, and the second poppet may prevent the vacuum operation. Because the valves should operate independently to be viable as double protection, it may not be feasible to make a fixed connection between the two poppets.

Issues may arise when the two poppets to operate independently during operation. For example, both poppets may not lift during the vacuum operation. Embodiments of the present disclosure provide a solution by creating a coupling between the two poppets (achieved, as described above with respect to FIGS. 2A-2C by the locking pin 258 disposed within bores 221E of the second poppet and bore 211D of the first poppet) that can have more clearance than required during relief operation, thus allowing the poppets to work independently. However, the clearance (FIG. 2C, 277) in the coupling can be small enough to be closed when manually lifting the external poppet, thereby also lifting the internal poppet; this can complete the conduit and allow for the vacuum/backfilling process.

Further embodiments also provide that, the coupling between the two poppets may not be restricted during operation. Rather, the coupling can be manually moved enough to influence the internal poppet with the external poppet. The coupling can be configured to allow for calibration of each PRV and then connect them in a simple, reliable way. The external poppet can attach to an external device to mechanically lift the external poppet, which in turn can also lift the internal poppet.

Figure 5:
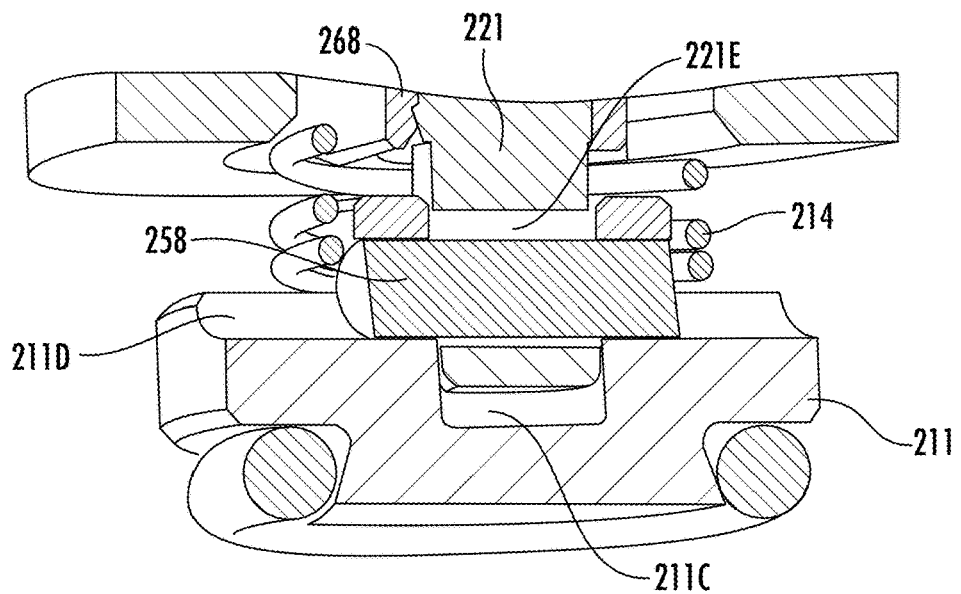
FIG. 5 is a cross sectional view of a portion of the dual poppet PRV in accordance with aspects of the present disclosure, illustrating installation and entrapment of a locking pin.
Figure 7:
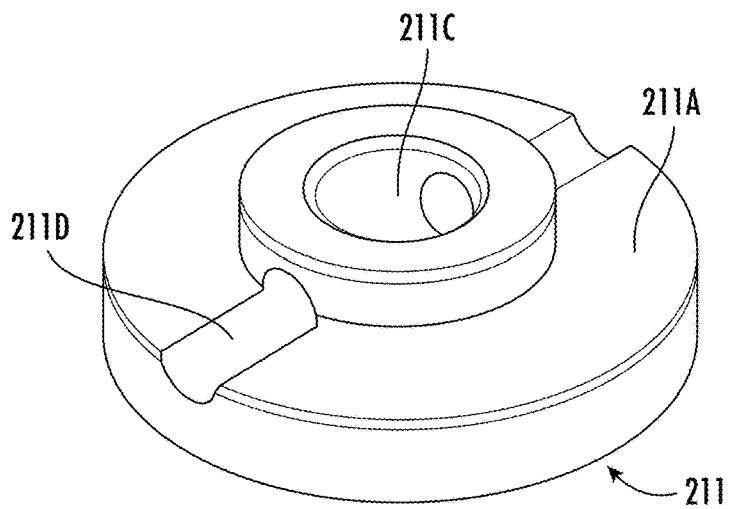
FIG. 7 is a top perspective view of a first poppet valve of the present invention.

As illustrated in FIGS. 2A-2C, an end of the external poppet 221 can be extended in a shaft-like fashion (e.g. threaded stem 221C). This shaft can slide into a bore 211C on the internal poppet 211 (FIG. 7), allowing independent movement of both the internal poppet and the external poppet. The sliding can be performed in a concentric fashion or any other desirable way. Both an external poppet shaft and an internal poppet bore can receive a cross-bore hole. As shown in FIG. 5, the coupling can be formed by sliding a locking pin 258 through the cross-bore that limits the (relative) axial movement between the two poppets 211, 221. Because independent axial movement may be required for operation, the pin 258 and bores 221E/211D can be configured for sufficient clearance. The clearance may be configured to include a large enough manual movement (lifting) of the external poppet 221 to close the gap and begin lifting the internal poppet 211. The pin 258 can be relatively loose to allow for independent poppet operation. The pin 258 can also be trapped from falling out by an internal PRV spring 214. The locking pin 258 can be formed of nylon, PRV thread lock material, or any other desired material. The pin 258 can be positioned in a lower portion of the dual poppet PRV 100. Also as shown in FIG. 5, the locking pin 258 can be inserted into the bores 211D/221E by lifting the first stage spring 214 and sliding the pin into the desired position or any other desired insertion method. After the pin 258 is positioned, the first stage spring 214 can be released. When the spring is released, the pin may be entrapped by the spring and remain in place.

In one exemplary embodiment, the pressure relief valve (PRV) includes a first poppet and a second poppet. The first poppet and the second poppet are packaged as one unit and work in series. The PRV can be configured to operate at extreme external pressures (such as in the deepest ocean at depths or other external pressure environments). For example, the external pressures in the ocean may include pressures at depths of 6,000 meters or greater.

The dual poppet PRV can include external features that interface with an adaptor and allow the PRV to be opened for evacuation and backfilling operations of the enclosure (e.g., a vacuum adaptor, a sealed enclosure). The dual poppet PRV can have an internal coupling between the two poppets that do not prevent independent operation of the poppets. The internal coupling between the two poppets can allow the internal poppet to be manually lifted by the external poppet. The internal coupling between the two poppets can use a sliding fit, or any other desired fit, that keeps the two poppets relatively concentric. The internal coupling between the two poppets can have a pin, such as a cross pin, or any other desired device, which limits the axial relative movement of the two poppets, allowing the external poppet to lift the internal poppet. The internal coupling between the two poppets can have the pin, such as the cross pin that does not inhibit the axial, relative movement, or any other desired movement, of the two poppets during operation. The internal coupling between the two poppets can have the pin, such as the cross pin, which is retained by the internal poppet spring.

Figure 3:
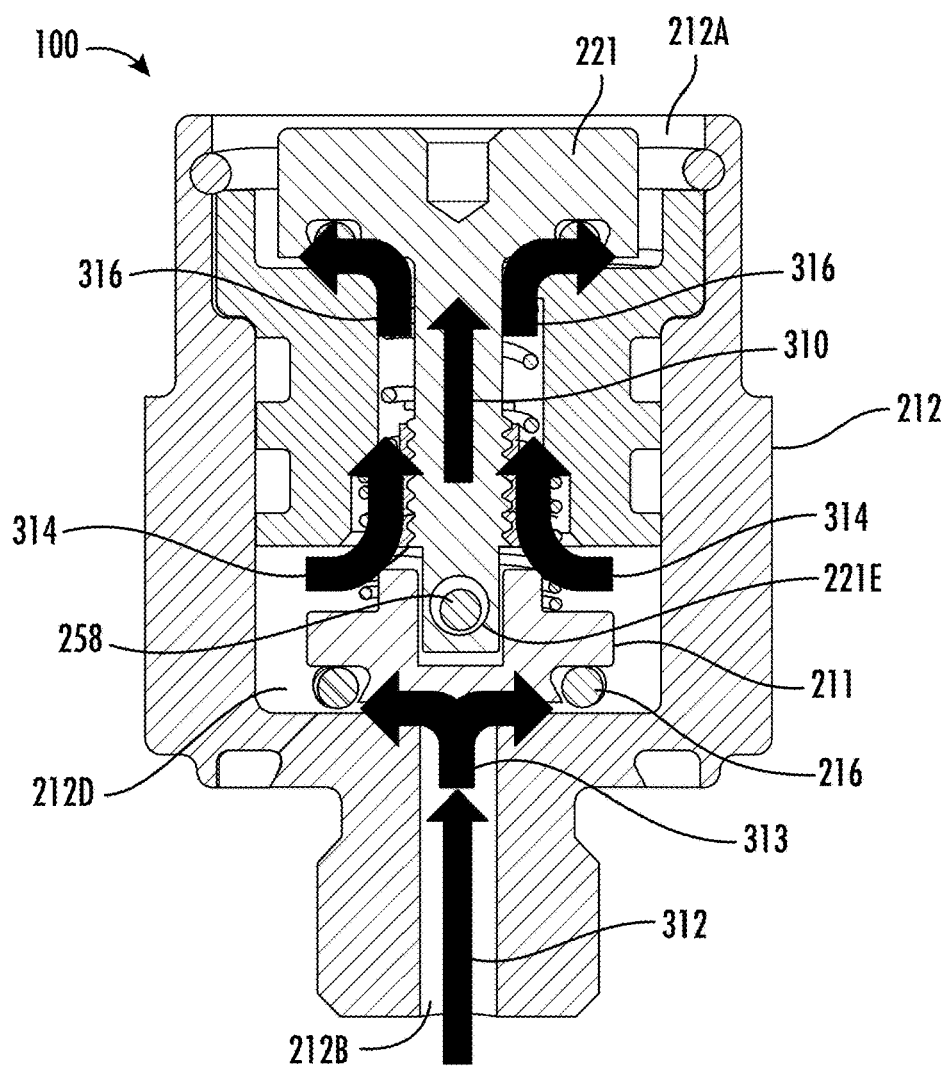
FIG. 3 is a cross sectional view of the dual poppet assembly functioning in accordance with aspects of the present disclosure.
Figure 6:
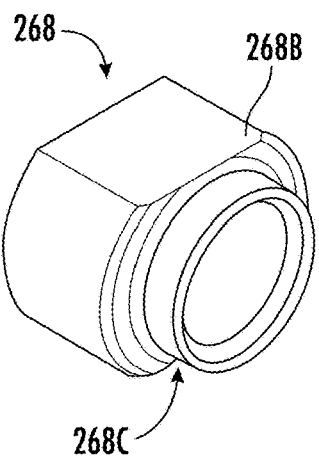
FIG. 6 is a perspective view of a valve adjustment nut of the present invention.

The example configuration shown in FIGS. 2-4 shows an adjustment nut 268 for adjusting the cracking pressure of the first and second poppet valves 211, 221. A perspective view of the nut 268 is shown on FIG. 6 and includes a flanged portion 268C to engage and retain the first stage spring 214, and flat surfaces 268B to allow the nut to be more easily turned on a threaded shaft 221G (see also FIG. 9), and to allow fluid communication between an external area proximate the opening 212A and internal area proximate the opening 212B. The internal bore of the nut 268 is typically threaded to engage with threads 221G (FIG. 9) of the shaft 221C, although threads are not shown in FIG. 6 for simplicity. In other embodiments other means may be used to set a cracking pressure, which may be adjustable, or alternatively may be set without adjustment. Further, one or both of the valves may have an adjustment available for the cracking pressure.

Figure 10:
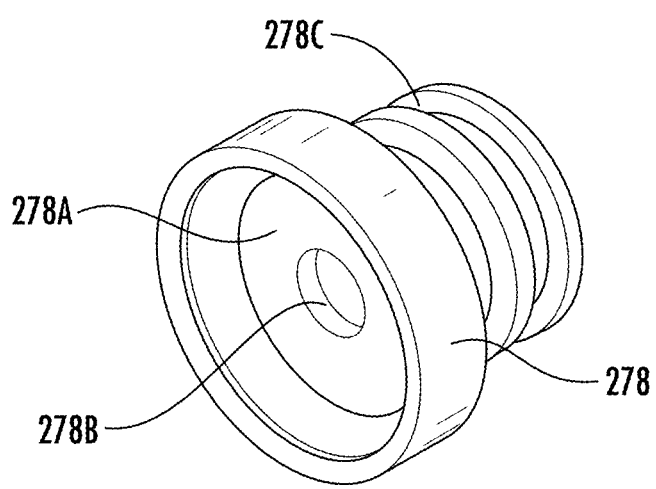
FIG. 10 is a perspective view of a second valve housing/body of the present invention.

FIG. 3 illustrates one mode of operation of the dual PRV 100 of the present invention. In this mode, a force 310 is applied to the second poppet 221 to pull the poppet toward the external opening 212A area. Such force may be applied through a tool traded into the bore 221D, adjacent bores 221A, as shown in FIG. 9. The second poppet 221 moves toward the external direction, coupling to the first poppet 211 through installed locking pin 258. Once sufficient force is applied to bias the first and second poppets 211, 221 into an open position, fluid communication may occur from, for example, an internal area 312 passing through opening 212B, around 313 the now-open seal 216 of the first poppet 211, into the enclosed or interior cavity 212D up 314 the enclosed cavity around the adjustment nut 268 (especially around flat portions 268B that allow fluid communication) and shaft 221C and through 316 the now-open area appearing between the seal 226 and the second housing surface 278A (FIG. 10). Releasing the force 310 will allow both valves to translate to a closed position through the spring forces of springs 224, 214.

FIG. 10 illustrates a perspective view of a second housing or body 278 of the present invention, where the second poppet 221 may be seated in area 278A, and the shaft 221C may pass through opening 278B to the cavity formed below once the part is installed. Grooves 278C are configured to provide mechanical coupling between the first housing 212 and the second housing 278, and the coupling is illustrated in FIGS. 2A-2B.

In the embodiments shown and discussed, particular configurations are shown by way of example, and other configurations and devices may be used within the disclosed novel inventive concepts. For example, the shape and configuration of the first body 212 and the second body 278 are shown by way of example. In alternative embodiments, the first body and the second body may be formed together rather than as two separate parts. Similarly, the type and configuration of the valve mechanisms may be any valve mechanism that allows a set cracking pressure and is capable of allowing fluid to flow in one direction, and withstand outside pressure. The drawings also show multiple redundant seals by way of example and not limitation. The invention may be practiced with any number of redundant seals sufficient to prevent fluid from passing from the exterior of the housing into the interior 212B of the housing 212.

In the example embodiments, springs are discussed and illustrated as coil springs, such as metal corrosion resistant material springs. Other springs may be used to provide force to keep the valve closed below the desired cracking pressure. A spring is any elastic object used to store mechanical energy.

The valve and housing discussed above may be used in a high pressure environment, such as in a deep sea environment. The fluid inside the housing may be air, or alternatively, it may be other fluids. The fluid outside the housing may be water, for example seawater, or it may be air or other fluids.

The example illustrated configurations shows an adjustment nut 268 for adjusting the cracking pressure of the valves. In other embodiments other means may be used to set a cracking pressure, which may be adjustable, or alternatively may be set without adjustment. Further, one or both of the valves may have an adjustment available for the cracking pressure.

The examples discussed above have described relieving pressure from inside a housing as an example application of the pressure relief valve. This is not by way of limitation as the pressure relief valve 100 may be used in any environment where fluids are to be controlled and allowed to flow in only one direction based on pressure differentials. The valve disclosed may allow fluid into a normally high pressure system when the pressure drops below a set value, such as in a water or gas supply system, and may be used for other applications other than those where pressure is relieved. In this manner an outside, external or exterior environment is describing the environment where fluid flows after the fluid passes through the second stage of the valve, and an inside, internal, or interior environment is describing the environment from which fluid will flow into the valve when the pressure differential allows the valve to open.

Figure 11A:
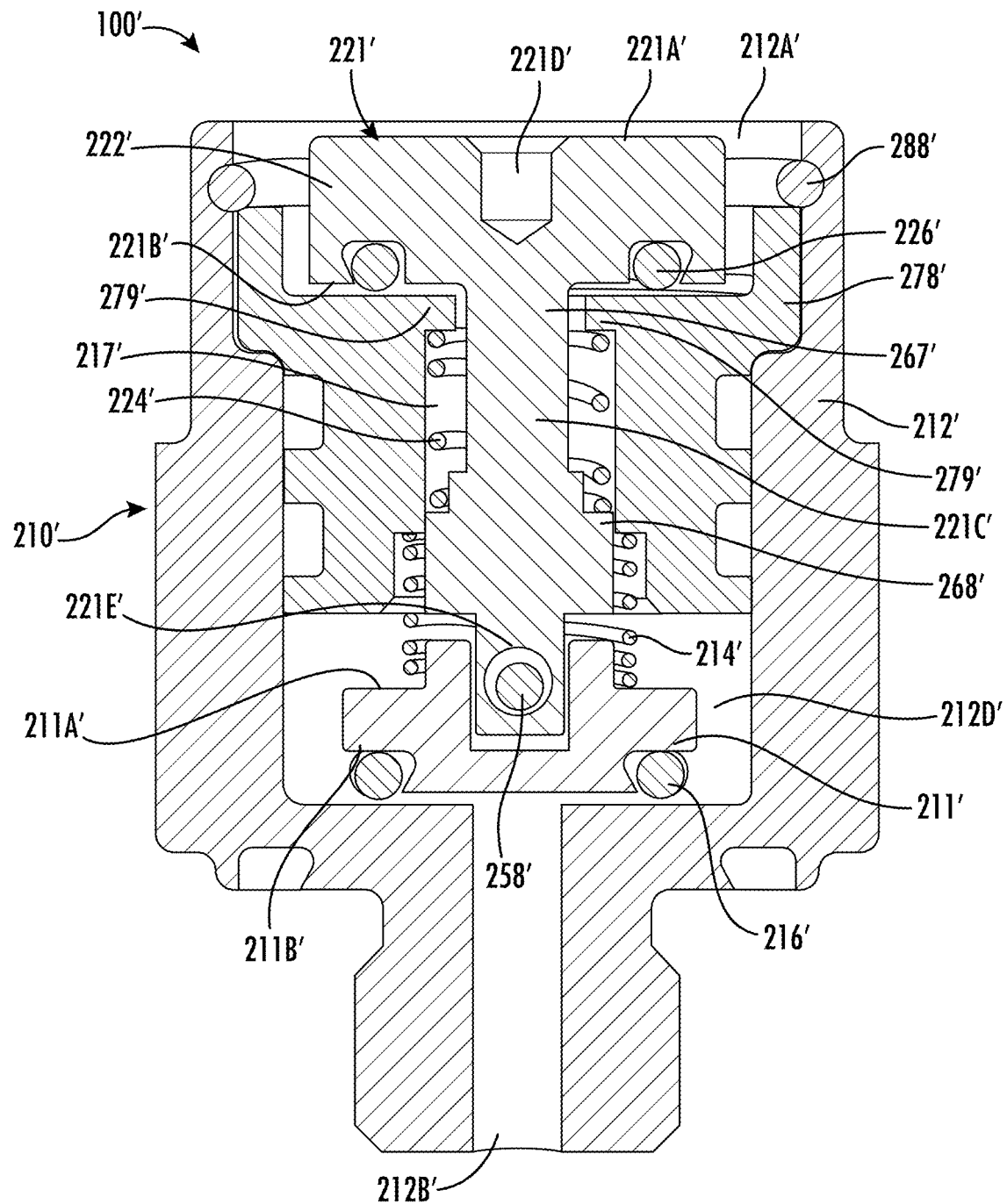
FIGS. 11A and 11B are cross-sectional views of a PRV assembly in accordance with another embodiment.
Figure 11B:
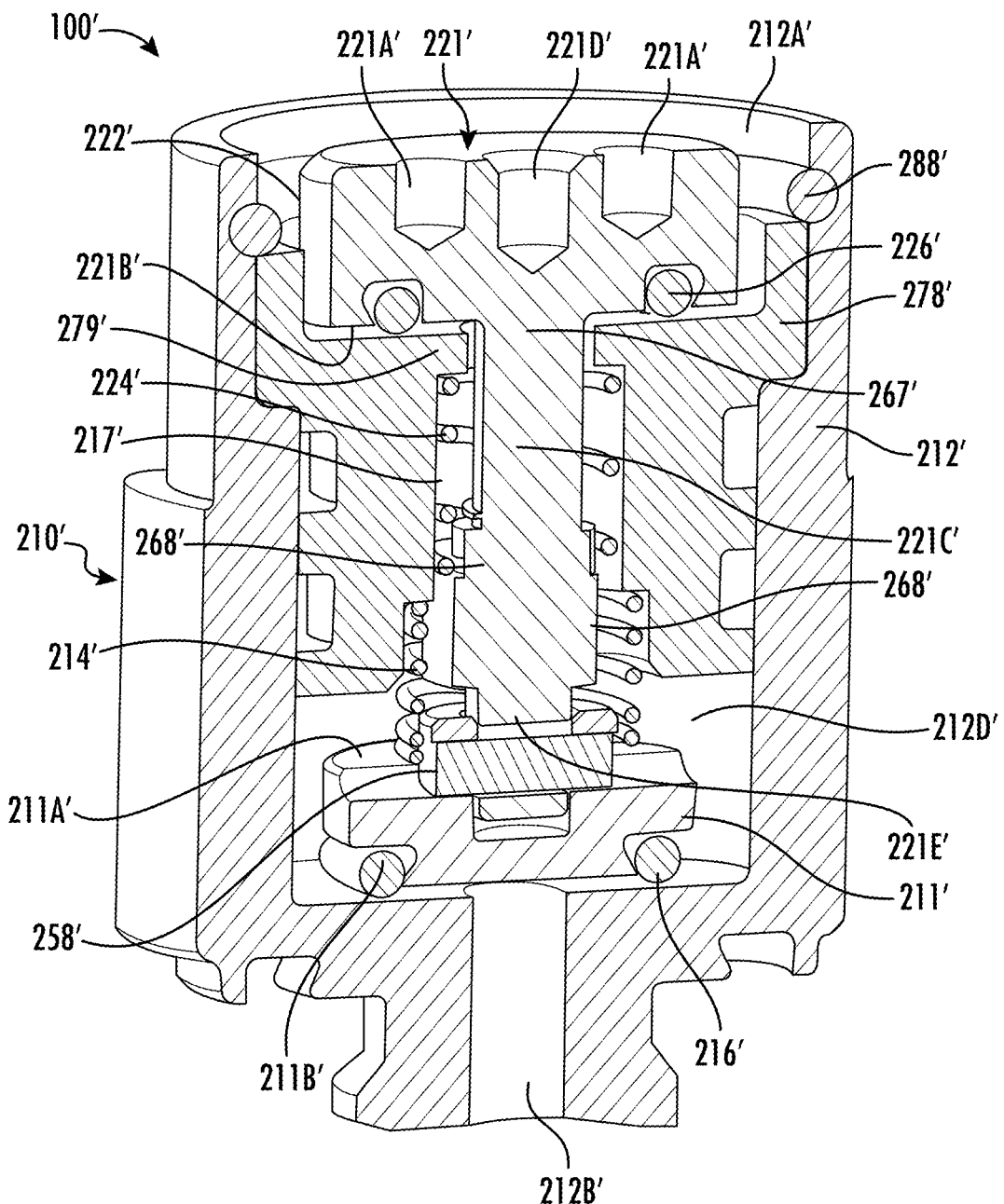

Referring now to FIGS. 11A and 11B, in another embodiment, the pressure relief valve assembly 100' includes a housing 210'. As will be appreciated by those skilled in the art, the housing 210' includes the first body 212' and the second body 278'. The first body 212' together with the second body 278' may define or be considered first and second nested housings, as the first body is slidably received within the second body. A housing seal 288', which is similar to the retainer described above, is between the first and second nested bodies 212', 278'. In some embodiments, the housing 210' may be a monolithic unit. The housing 210' has an opening 212A' therein. The housing 210' also includes an interior cavity 212D'.

A passageway 217' extends between the interior cavity 212D' and the opening 212A' so that fluid may pass between the interior cavity to the opening. A flange 279' extends within the passageway 217' adjacent the opening 212A'. The flange 279' defines a shoulder supporting the second stage spring or first biasing member 224'. The first biasing member 224' is illustratively in the form of a coil spring. Those skilled in the art will appreciate that the first biasing member 224' may be in the form of another type of biasing member. Further details of the first biasing member 224' will be explained in further detail below.

The PRV assembly 100' also includes a first stage valve 211'. The first stage valve 211' is carried within the interior cavity 212D'. The first stage valve 211' is similar to the first stage valve 211 described above.

The PRV assembly 100' further includes a second stage valve 221'. The second stage valve 221' is fluidly coupled to, in series, with the first stage valve 211'. The second stage valve 221' includes an enlarged head 222' carried within the opening 212A'. The second stage valve 221' also includes a shaft 221C' that extends from the enlarged head 222' and through the passageway 217' to the interior cavity 212D'. The shaft 221C' has a proximal end 267' adjacent the enlarged head 222' and an enlarged distal end 268' or enlarged segment downstream from the enlarged head. In other words, while an enlarged distal end 268' is described, those skilled in the art will appreciate that the enlarged portion may be distanced from an actual and adjacent the end. A seal 226' is carried by an underside 221B' of the enlarged head 222' sealably engaging adjacent portions of the housing, and more particularly, the second body 278' of the housing 210'.

The enlarged distal end 268' illustratively flares, for example, in a stepped fashion. In some embodiments, the enlarged distal end 268' may not be flared. The enlarged distal end 268' illustratively has an enlarged diameter or circumference relative to other portions of the shaft 221C'. The second stage valve 221' including the enlarged head 222' and shaft 221C' (e.g., including the enlarged distal end 268') may be a monolithic unit or monolithically formed, as will be appreciated by those skilled in the art.

The first biasing member 224' is between the enlarged distal end 268' of the shaft 221C' and the flange 279'. The first biasing member 224' biases the first and second stage valve 211', 221' to a closed position.

A coupling member 258', for example, in the form of a locking pin, as described above, couples the first stage valve 211' to the shaft 221C'. The coupling member 258' couples the first stage valve 211' by way of an opening in the first stage valve body and an opening 221E' (or bore) in the shaft adjacent the distal end. The first stage valve body of the first stage valve 211' has a second opening, or horizontal bore, traverse to the first opening and is aligned with the shaft opening for receiving the coupling member 258' therethrough. Further details of the coupling arrangement between the first and second stage 211', 221' valves are described above.

A second biasing member 214' or first stage spring, illustratively in the form of a coil spring, is between the first biasing member 224' and the first stage valve 211'. The second biasing member 214' biases the first stage valve 211' to a closed position. More particularly, the passageway 217' has a recess therein defining a flange or shoulder. The recess is adjacent the interior cavity 212D'. The second biasing member 214' rests on the shoulder defined by the recess in the passageway 217'. An opposing end of the second biasing member 214' rests on an upper surface 211A' of the first stage valve 211'. The upper surface 211A' defines a shoulder or flange for the second biasing member 214'. The second biasing member 214' is around the enlarged distal end 268', and more particularly, surrounds a longitudinal portion of the enlarged distal end.

An orifice 212B' is sealed by first stage valve 211'. The orifice 212B' connects the interior cavity 212D' with an exterior of the PRV assembly 100'. A seal 216' carried by the underside 211B' of the first stage valve 211', and more particularly, an underside of the first stage valve body. The seal 216' sealably engages adjacent portions of the housing 210', and more particularly, the first body 212', within the interior cavity 212D'.

Elements illustrated, but not specifically described in the present embodiment, are similar to those described above. For example, the bore 221D' and adjacent bores 221A' are similar to the bore 221D and adjacent bores 221A, described above.

Figure 12:
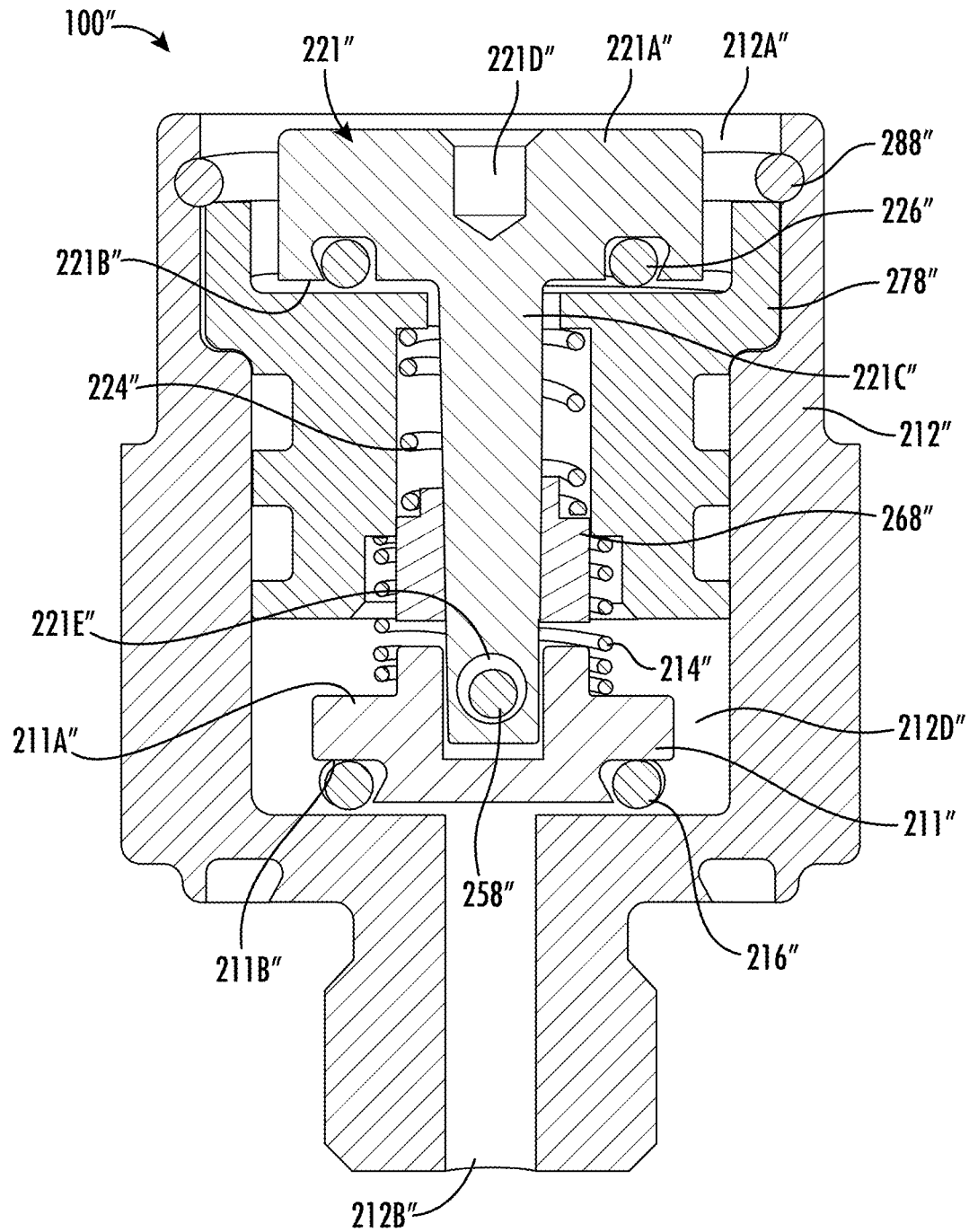
FIG. 12 is a cross-sectional view of a PRV assembly in accordance with another embodiment.

Referring now to FIG. 12, in another embodiment of the PRV assembly 100", a distal body 268" is carried by the shaft 221C" to define an enlarged area along the length of the shaft. More particularly, the distal body may be welded or otherwise coupled to the shaft 221C" where, in previous embodiments, the nut 268 was coupled or the shaft enlarged. While the distal body 268" has been described as being welded, those skilled in the art will appreciate that the distal body may be coupled to the shaft 221C' using other and/or additional coupling techniques.

Elements illustrated, but not specifically described in the present embodiment, are similar to those described above. For example, the second stage valve 221", bore 221D", adjacent bores 221A", opening 212A", housing seal 288' ', seal 226", second body 278", first body 212", second biasing member 214", interior cavity 212D", first stage valve 211", seal 216", coupling member 258", orifice 212B", underside 211B", upper surface 211A", opening 221E", first biasing member 224' ', underside 221B" are similar to the second stage valve 221', bore 221D, adjacent bores 221A, opening 212A', housing seal 288', seal 226', second body 278', first body 212', second biasing member 214', interior cavity 212D', first stage valve 211', seal 216', coupling member 258', orifice 212B', underside 211B', upper surface 211A', opening 221E', first biasing member 224', and underside 221B', described above.

Figure 13A:
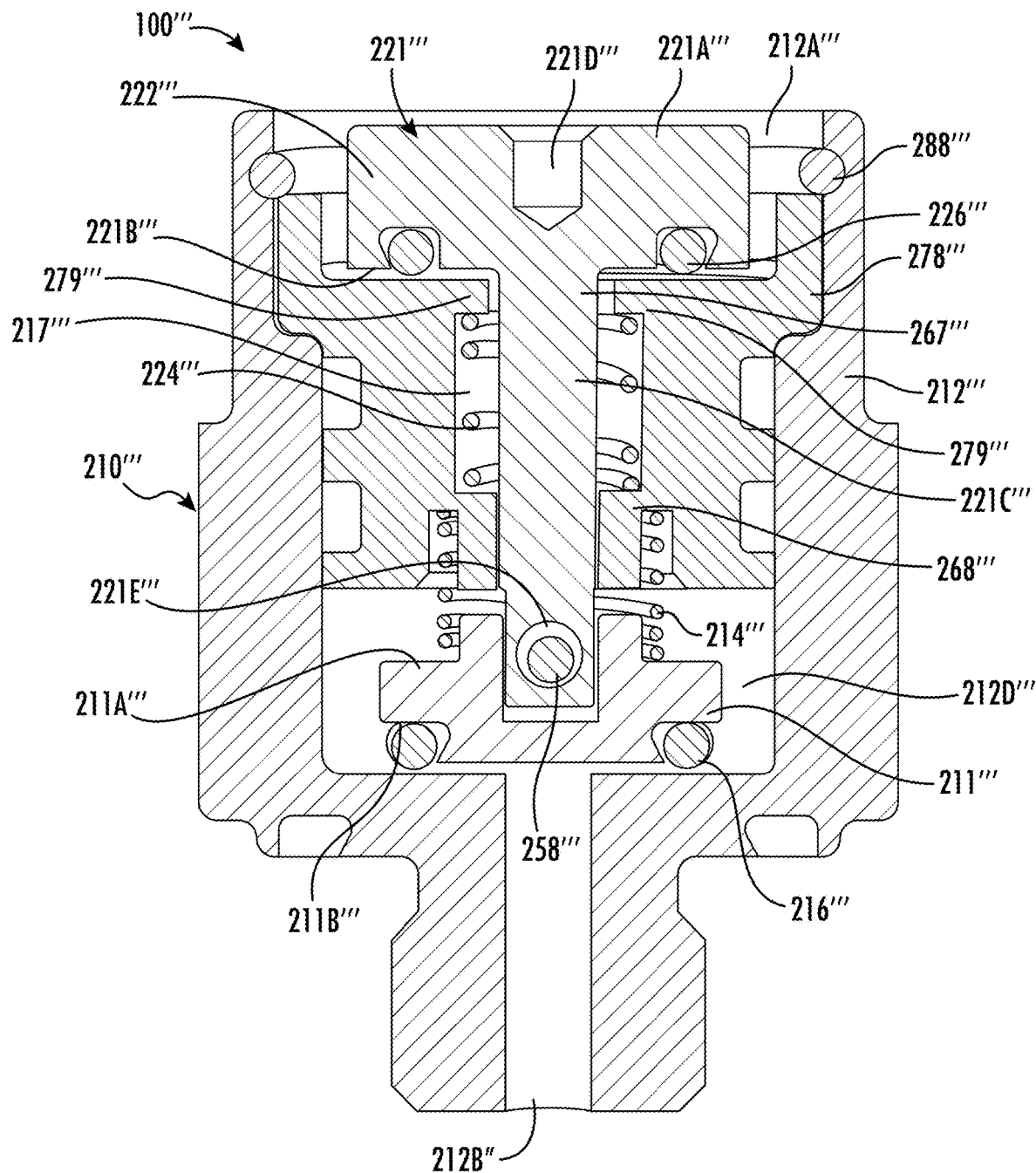
FIGS. 13A and 13B are cross-sectional views of a PRV assembly in accordance with another embodiment.
Figure 13B:
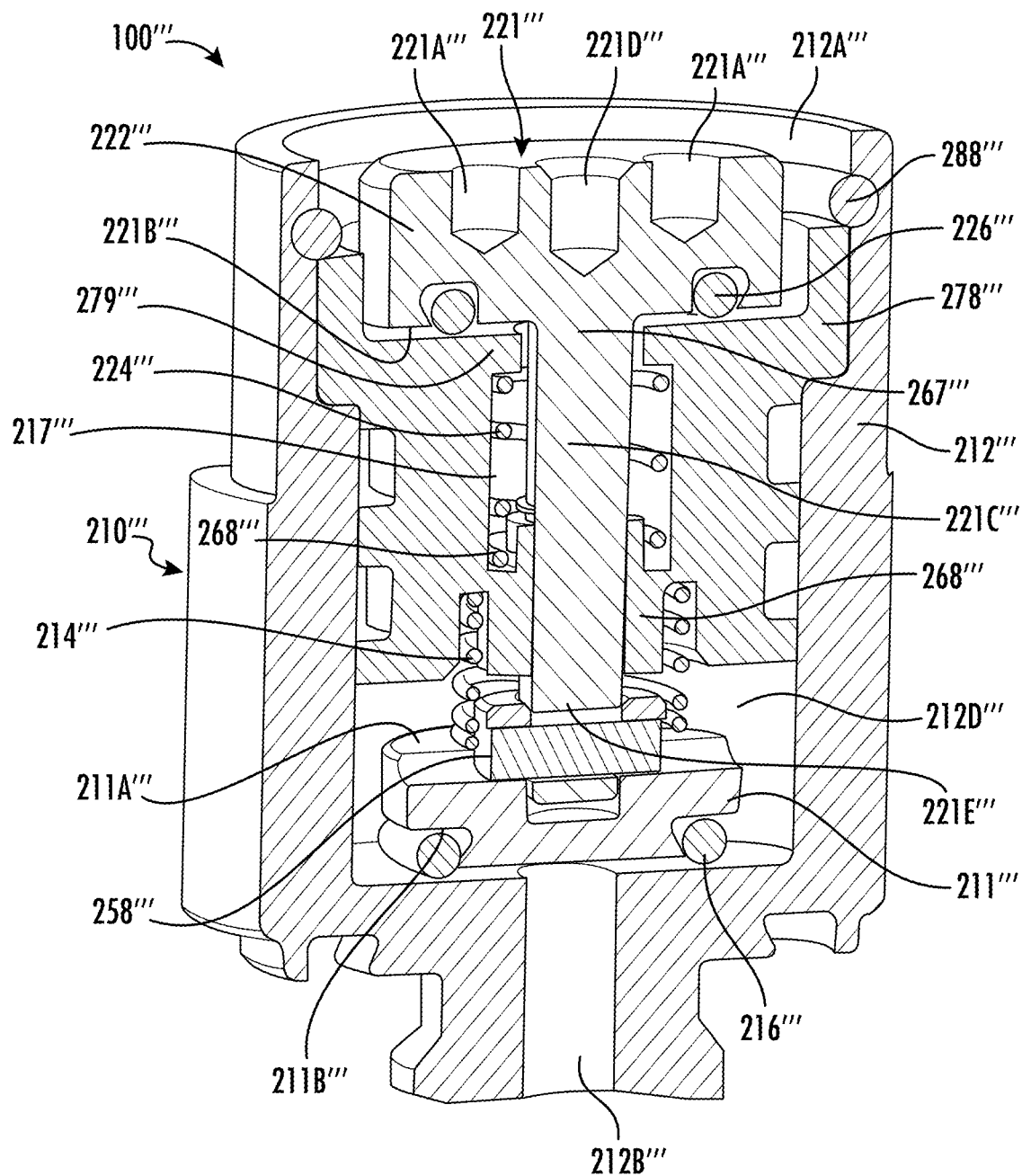

Referring now to FIGS. 13A and 13B, in another embodiment of the PRV assembly 100''', the second body 278''' of housing 210''' includes a constriction 268'''' that extends within the passageway 217'''. This is in contrast to other embodiments whereby the constriction was defined by either a nut 268, an enlarged distal portion 268' of the shaft 221C', or a distal body 268" carried by the shaft. The constriction 268'''' defines a slot for the second biasing member 214''' and also provides a shoulder or flange for the first biasing member 224'''. In the present embodiment, the shaft 221C''', during operation of the PRV assembly, and more particularly, the first and second stage valves 211''', 221''', may slide within the passageway 217''' and through the opening defined by the constrictions 268''''.

Elements illustrated, but not specifically described in the present embodiment, are similar to those described above. For example, bore 221D''', adjacent bores 221A''', opening 212A''', housing seal 288''', seal 226''', first body 212''', interior cavity 212D''', seal 216''', coupling member 258''', orifice 212B''', underside 211B''', upper surface 211A''', opening 221E''', underside 221B''', enlarged head 222''', flange 279''', and proximal end 267''' are similar to bore 221D, adjacent bores 221A, opening 212A', housing seal 288', seal 226', first body 212', interior cavity 212D', seal 216', coupling member 258', orifice 212B', underside 211B', upper surface 211A', opening 221E', underside 221B', enlarged head 222', flange 279', and proximal end 267' described above.

A method aspect is directed to a method of making a pressure relief valve (PRV) assembly 100'. The method includes positioning a first valve 211' within an interior cavity 212D' of a housing 210' having an opening 212A' therein, a passageway 217' extending between the opening and the interior cavity, and a flange 279' extending within the passageway adjacent the opening. The method includes positioning a second stage valve 221' fluidly in series with the first stage valve 211'. The second stage valve 221' includes an enlarged head 222' carried within the opening 212A' and a shaft 221C' extending from the enlarged head through the passageway 217' to the interior cavity 212D'. The shaft 221C' has a proximal end 267' coupled to the enlarged head 222' and an opposing enlarged distal end 268' adjacent the interior cavity 212D'. The method further includes positioning a biasing member 224' between the enlarged distal end 268' of the shaft 221C' and the flange 279' for biasing the first and second stage valves 211', 221' in a closed position.

The method also includes positioning a coupling member 258' to couple the first stage valve 211' to the shaft 221C'. Positioning the coupling member 258' may include coupling a locking pin, for example. Positioning the biasing member 224' may include positioning a coil spring, for example. The method may also include positioning a second biasing member 214' between the first biasing member 224' and the first stage valve 211'.

While several embodiments have been described herein, it should be appreciated by those skilled in the art that any element or elements from one or more embodiments may be used with any other element or elements from any other embodiment or embodiments. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

The invention claimed is:

1. A pressure relief valve (PRV) assembly comprising:
   a housing having an opening therein, an interior cavity, a passageway extending between the opening and the interior cavity, and a flange extending within the passageway adjacent the opening;
   a first stage valve carried within the interior cavity;
   a second stage valve fluidly coupled in series with the first stage valve and comprising an enlarged head carried within the opening and a shaft extending from the enlarged head through the passageway to the interior cavity, the shaft having a proximal end coupled to the enlarged head and an opposing enlarged distal end adjacent the interior cavity; and
   a biasing member between the enlarged distal end of the shaft and the flange and configured to bias the first and second stage valves to a closed position.

2. The PRV assembly of claim 1 further comprising a coupling member coupling the first stage valve to the shaft.

3. The PRV assembly of claim 2 wherein the coupling member comprises a locking pin.

4. The PRV assembly of claim 1 wherein the biasing member comprises a coil spring.

5. The PRV assembly of claim 1 further comprising a second biasing member between the first biasing member and the first stage valve.

6. The PRV assembly of claim 5 wherein the second biasing member is around the enlarged distal end of the shaft.

7. The PRV assembly of claim 1 wherein the housing has an orifice therein from the interior cavity to an exterior of the housing; and wherein the first stage valve comprises a first stage valve body and a seal carried by the first stage valve body and configured to sealably engage adjacent portions of the housing within the interior cavity.

8. The PRV assembly of claim 1 wherein the first stage valve comprises a first stage valve body having a first opening therein receiving the shaft therein.

9. The PRV assembly of claim 8 further comprising a coupling member; and wherein the shaft has a shaft opening therein adjacent the enlarged distal end thereof; and wherein the first stage valve body has a second opening therein transverse to the first opening and aligned with the shaft opening for receiving the coupling member therethrough.

10. The PRV assembly of claim 1 wherein the second stage valve comprises a seal carried by the enlarged head and configured to sealably engage adjacent portions of the housing within the opening.

11. The PRV assembly of claim 1 wherein the housing comprises first and second nested housings.

12. The PRV assembly of claim 11 further comprising a housing seal between the first and second nested housings.

13. A pressure relief valve (PRV) assembly comprising:
a housing having an opening therein, an interior cavity, a passageway extending between the opening and the interior cavity, and a flange extending within the passageway adjacent the opening;
a first stage valve carried within the interior cavity;
a second stage valve fluidly coupled in series with the first stage valve and comprising an enlarged head carried within the opening and a shaft extending from the enlarged head through the passageway to the interior cavity, the shaft having a proximal end coupled to the enlarged head and an opposing enlarged distal end adjacent the interior cavity;
a coupling member coupling the first stage valve to the second stage valve;
a first biasing member between the enlarged distal end of the shaft and the flange for biasing the first and second stage valves in a closed position; and
a second biasing member between the first biasing member and the first stage valve.

14. The PRV assembly of claim 13 wherein the coupling member comprises a locking pin.

15. The PRV assembly of claim 13 wherein the first biasing member comprises a coil spring.

16. The PRV assembly of claim 13 wherein the second biasing member is around the enlarged distal end of the shaft.

17. The PRV assembly of claim 13 wherein the housing has an orifice therein from the interior cavity to an exterior of the housing; and wherein the first stage valve comprises a first stage valve body and a seal carried by the first stage valve body and configured to sealably engage adjacent portions of the housing within the interior cavity.

18. The PRV assembly of claim 13 wherein the first stage valve comprises a first stage valve body having a first opening therein receiving the shaft therein.

19. A method of making a pressure relief valve (PRV) assembly comprising:
positioning a first stage valve within an interior cavity of a housing having an opening therein, a passageway extending between the opening and the interior cavity, and a flange extending within the passageway adjacent the opening;
positioning a second stage valve fluidly in series with the first stage valve, the second stage valve comprising an enlarged head carried within the opening and a shaft extending from the enlarged head through the passageway to the interior cavity, the shaft having a proximal end coupled to the enlarged head and an opposing enlarged distal end adjacent the interior cavity; and
positioning a biasing member between the enlarged distal end of the shaft and the flange for biasing the first and second stage valves in a closed position.

20. The method of claim 19 further comprising positioning a coupling member to couple the first stage valve to the shaft.

21. The method of claim 20 wherein positioning the coupling member comprises coupling a locking pin.

22. The method of claim 19 wherein positioning the biasing member comprises positioning a coil spring.

23. The method of claim 19 further comprising positioning a second biasing member between the first biasing member and the first stage valve.

* * * * *